(12) United States Patent
Deng et al.

(10) Patent No.: US 6,377,650 B1
(45) Date of Patent: Apr. 23, 2002

(54) COUNTER REGISTER MONITOR AND UPDATE CIRCUIT FOR DUAL-CLOCK SYSTEM

(75) Inventors: Brian T. Deng; Michael D. McKinney, both of Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 68 days.

(21) Appl. No.: 09/638,830

(22) Filed: Aug. 14, 2000

Related U.S. Application Data

(60) Provisional application No. 60/150,903, filed on Aug. 26, 1999.

(51) Int. Cl.[7] ............................................. H03K 23/00
(52) U.S. Cl. ......................... 377/118; 327/141; 710/33; 710/61
(58) Field of Search ................................. 377/118, 119, 377/64, 70, 77, 78; 327/141, 144, 145; 710/33, 52, 58, 61, 128, 129, 130, 113, 39

(56) References Cited

U.S. PATENT DOCUMENTS

| | | | |
|---|---|---|---|
| 5,256,994 A | 10/1993 | Langendorf et al. | 331/16 |
| 5,442,796 A | 8/1995 | Zastrow et al. | 712/36 |
| 5,497,466 A | 3/1996 | Roden et al. | 710/126 |
| 5,500,946 A | 3/1996 | Roden et al. | 710/128 |
| 5,619,544 A | 4/1997 | Lewis et al. | 375/377 |
| 5,647,057 A | 7/1997 | Roden et al. | 712/200 |
| 5,832,254 A | 11/1998 | Brewer | 709/400 |
| 6,240,508 B1 * | 5/2001 | Brown, III et al. | 710/39 |
| 6,263,419 B1 * | 7/2001 | Boutaud et al. | 710/38 |

* cited by examiner

Primary Examiner—Tuan T. Lam
(74) Attorney, Agent, or Firm—April Mosby; W. James Brady; Frederick J. Telecky, Jr.

(57) ABSTRACT

An improved counter register (30) and method of transferring data from a host data bus (29) controlled by a first clock source (BCLK) to the cycle timer (18) controlled by a second clock source (NCLK) which frees the host data bus (29) to perform other functions while a clock synchronization process occurs to allow the data (24) to be written to the counter register (30) or read from the counter register (30). This synchronization scheme is such that at any time the host data bus (29) may read data (25) from the cycle timer (18) and retrieve the current counter register value. In the alternative, at any time, the host data bus (29) may write to the cycle timer (18) and it will receive this data (24) immediately. In either case, the data is transferred immediately without the host data bus (29) having to wait for synchronization across the aforementioned clock boundary.

11 Claims, 13 Drawing Sheets

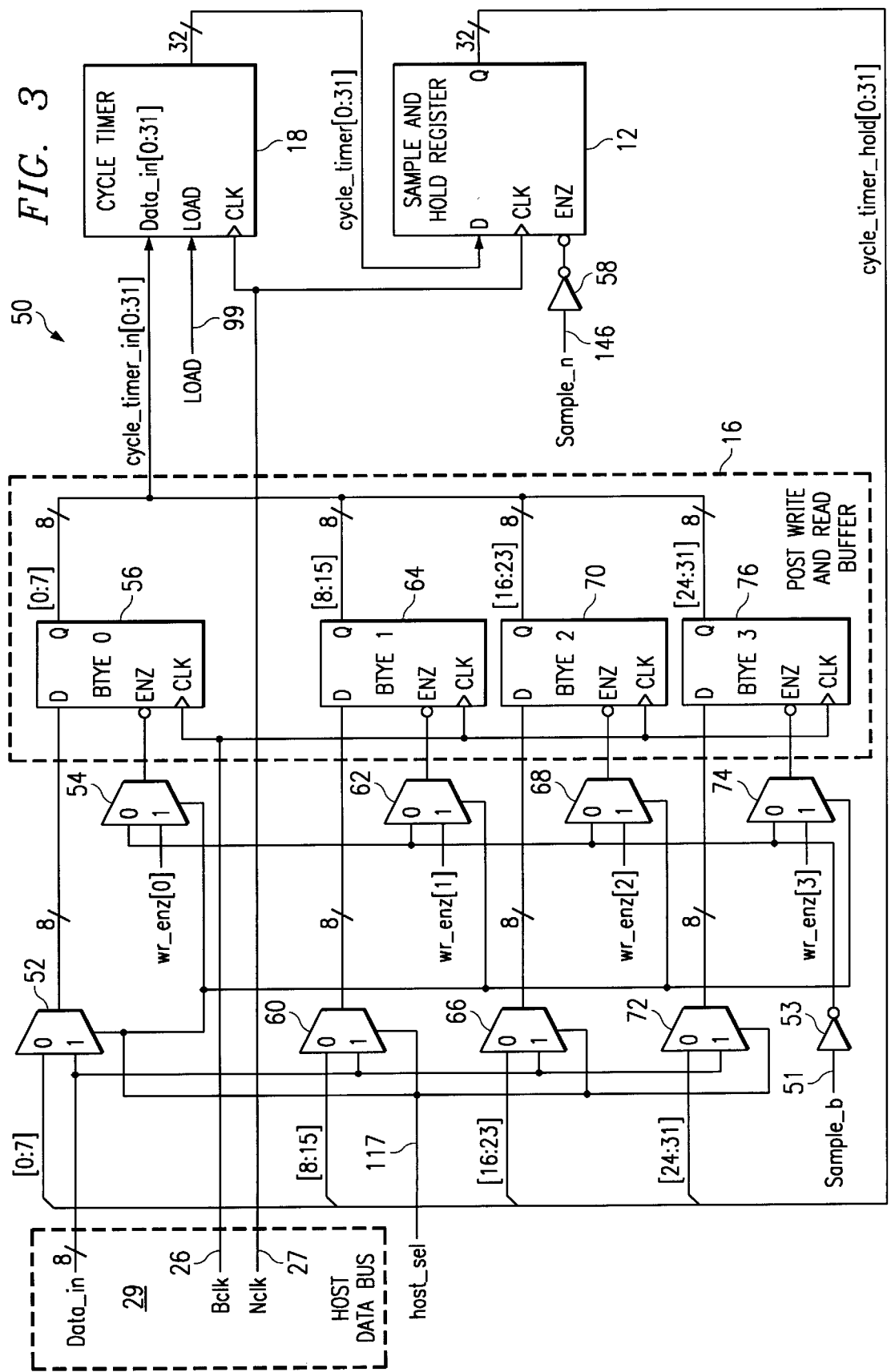

COUNTER REGISTER MONITOR AND UPDATE CIRCUIT FOR DUAL-CLOCK SYSTEM

CROSS REFERENCE TO RELATED APPLICATIONS

This application claims priority under 35 USC 119(e)(1) of provisional application No. 60/150,903 filed Aug. 26, 1999. This inventions uses a adaptation of the post write buffer of our copending application, Ser. No. 60/116,623, filed date is Jan. 19, 1999. In addition this invention uses the implementation of the state-machine which defines an idle state, a sample state, and a wait state for the status register of our copending application, Ser. No. 60/103/419, filed Oct. 7, 1998. Both applications are incorporated by reference herein.

FIELD OF THE INVENTION

This invention relates generally to the field of computer data bus systems, and more particularly to a counter register monitor and update circuit for a dual clock system.

BACKGROUND OF THE INVENTION

Computers, digital cameras, printers and scanners demand reliable, high speed communications. The trend in computerized systems is toward increasing communication speeds and decreasing bandwidth requirements. Imaging and video signals require precise synchronization of communications in order to prevent jittery graphics due to lost frames or other synchronization problems.

Computer systems may use bus transactions to communicate with an external system such as a printer. Most host systems include a counter register that generates a count. The host system may send counter register data to the external system. Within the computer system, communication takes place across the host data bus. The host data bus is a collection of wires through which data, a destination address, and other information is transmitted from one part of the computer to another. The host data bus is connected to a configuration block which contains several configuration and control registers, one of which includes a counter register. Although a counter register in the configuration block can be up to 32-bits wide, the host data bus is often 8 or 16-bits wide. Thus, multiple transfers are necessary in order to write and read the necessary information to the configuration block registers.

Although it is preferable to have the host data bus and the counter register to operate on the same clock source, thereby eliminating any clock synchronization issues, these two key components of a computer system often are attached to separate clock sources operating at different frequencies. Thus, before data and information from the host data bus can be transferred to the counter register, the two clock sources must be synchronized. When writing data to the counter register, there is a small amount of time when the data is not stable. A register that will contain a "1" after it has been stabilized may be read as a "0" during this unstable period. If the data is read during this time, the results are unpredictable. Reliable data transfer requires synchronization between the clocks so that the systems will not read unstable data or data communications may fail.

To eliminate the possibility of reading the counter register when it is in an unstable state, a process of handshaking must take place between the host data bus and the counter register. Handshaking is an exchange of a predetermined sequence of signals between two devices to establish synchronization between sending and receiving equipment for the purpose of exchanging data and status information.

Conventional handshaking solutions between the host data bus and the counter register provide low performance and low data throughput. A primary cause of the reduced performance and low throughput is the addition of bus cycles required to attain synchronization between the host data bus clock and the counter register clock. For example, bus cycles are lost waiting for the host bus request signal to become synchronized by the counter register clock. Similarly, the response sent by the counter register needs to be received under a synchronous environment with the host data bus clock before the transaction may be completed. The host bus wastes bandwidth by essentially "standing by" while waiting for handshaking to become synchronized, when it could perform other transactions. When accessing counter registers, there are at least two host bus clock cycles and three external system clock cycles which are wasted. With conventional handshaking each read transaction generally takes at least four host bus clock cycles and three external clock cycles and each write transaction generally takes at least four host clock cycles and three external clock cycles.

This clock synchronization process often results in a bottleneck of data and information waiting to be transferred to different parts of the computer. Additionally, since there is a constant change of the counter register during synchronization of the clocks, the value of the count retrieved from counter is not the accurate count of the register at the time the read request has been initiated. Some implementations of the clock synchronization process calculate the number of counter clock periods which have lapsed since the write/read request. However, this implementation requires more logic and, thus, is not cost effective solution.

Another computer system having clock synchronization, disclosed in our copending application, Ser. No. 60/116,623, filed Jan. 19, 1999, uses a post write buffer which is coupled to both the host data bus and the configuration block and functions to buffer the data in the host data bus until all registers in the configuration block are available to receive it. Since the data is buffered until all registers have been synchronized, the speed of data transfer is not optimum.

Thus, the current methods of connecting a host data bus and the counter register clocked by separate clock sources do not provide an efficient system, but one that often results in bottlenecks within the host data bus or substantial delay in the transfer of data.

SUMMARY OF THE INVENTION

From the foregoing, a need has arisen for an improved counter register and method of transferring data from a host data bus controlled by a first clock source to the counter register controlled by a second clock source which frees the host data bus to perform other functions while a clock synchronization process occurs to allow the data to be written to the counter register or read from the counter register. In accordance with the present invention to solve the long bus latency problem associated when a host data bus accesses a counter register, additional circuitry, such as, a post write/read buffer, control circuit, and sample and hold circuit, for a dual clock system is provided which substantially eliminates or reduces disadvantages or problems associated with conventional interconnections between a host data bus and counter register.

According to one embodiment of the present invention, there is provided a post write/read buffer which is coupled to both the host data bus and the counter register and functions to buffer the data of the host data bus until the counter register and the host data bus are ready to send or receive this data. At power up, automatic clear circuitry resets the post write/read buffer, the sample and hold register, the cycle timer and the control circuit.

The post read write buffer consists of a data buffer for each of the four bytes of data corresponding to the four bytes of the counter register or the host data bus. Control circuitry functions to synchronize the clocks while generating signals that determine which byte of data should be written or read and when internal data transfers should be made. The control circuit consists of an address decoder/write enable circuit and synchronization logic. The control circuit determines the states of the counter which is either of the three: idle, sample, or wait states.

The control circuit and post write/read buffer are set by the host data bus clock, while the sample and hold register and counter are set by the internal counter register clock. At the rising edge of the internal counter clock, the control circuit sends a flag to the sample and hold register to transfer the current count value from the cycle timer to the sample and hold register. The sample and hold register is coupled to the post write/read buffer such that the current counter value from the sample and hold register sits at the input of the post write/read buffer, however is not transferred to the buffers internal to the post write/read buffer. Upon the rising edge of the host data bus clock, the control circuit generates a second flag for the post write/read buffer to transfer the current count value at its input to its internal buffers.

During a write the data is stored in the post write/read buffer and handshake synchronization occurs in the background. Once the clocks are synchronized, the post write/read buffer transfers the data to the cycle timer.

The present invention includes this synchronization scheme such that at any time the host data bus may read data from the counter register and retrieve the current counter register value. In the alternative, at any time, the host data bus may write to the counter register and the counter register receive this data immediately. In either case, the data is transferred immediately without the host data bus having to wait for synchronization across the aforementioned clock boundary. Thus, this architecture does not require host data bus idling while handshaking with another clock system. Handshaking may be performed in the background.

The present invention provides various technical advantages over current computer system data buses. It eliminates the need for the host data bus to remain idle while waiting for the clocks to be synchronized so that data can be transferred from the host data bus to the counter. Also, the bandwidth of the host data bus is more fully utilized since the data bus does not need to remain idle. This substantially reduces the bottleneck which often occurs in the host data bus thereby increasing the performance of the computer as a whole. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 3 is a schematic of the post write/read buffer, counter, sample and hold register in accordance with the present invention.

DETAILED DESCRIPTION OF PREFERRED EMBODIMENTS

Figure 1:
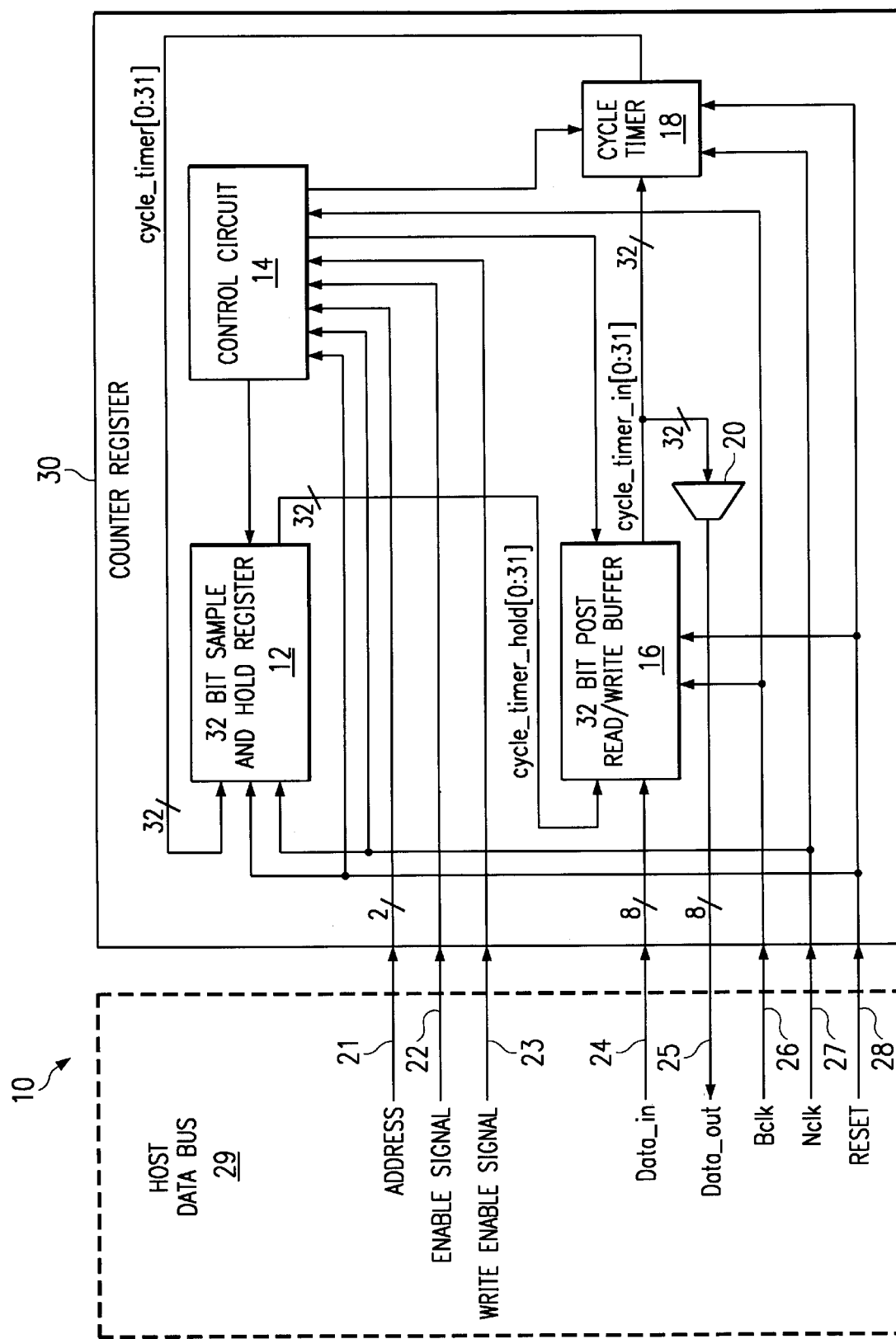
FIG. 1 is a block diagram of a counter register for a 8-bit data bus in accordance with the present invention.

FIG. 1 displays a block diagram of the innovative counter register 30 in accordance with the present invention. A computer (not shown) includes a central processing unit which communicates with a host data bus 29. The host data bus 29 is the communications path for all communications among the several components of a computer. The host data bus 29 may contain an address signal 21 carrying the address information to indicate which data byte is being transferred of data information carried on a data signal 24. The host data bus 29 may also contain a buffer write enable signal 23 which is a logic level "0" when host data bus 29 is ready to transfer data signal 24 to a post write/read buffer 16 and a logic level "1" when the host data bus 29 is not ready to transfer data signal 24 to post write/read buffer 16. The host data bus 29 operates at a frequency controlled by a first clock BCLK 26.

The data signal Data_in 24 of the host data bus 29 is coupled to a 32-bit post write/read buffer 16 which itself is coupled to a cycle timer 18. The cycle timer 18 is a counter register. The post write/read buffer 16 acts as a data buffer between the host data bus 29 and the cycle timer 18. Buffering data in the post write/read buffer 16 enables the host data bus 29 to proceed with other functions rather than waiting on the cycle timer 18 to accept the data, Data_in. The cycle timer 18 couples to a 32-bit sample and hold register 12 which continues to sample the count of the cycle timer 18 during the synchronization of the host data bus 29 and the cycle timer 18. Thus, a current value of the cycle timer 18 count exists within the sample and hold register 12 at all times. A first clock, a host data bus clock BCLK 26, is coupled to the post write/read buffer 16 and the control logic 14; while a second clock, an internal clock signal NLCK 27, provides a clocking signal for the sample and hold register 12, the control logic 14, and the cycle timer 18. The control circuit 14 provides synchronization as well as an addressing scheme whereby the address lines 21, enable signal 22 and write enable signal 23 generate flags to determine which byte is being read or written to the post write/read buffer 16.

During a host data bus read operation, the control circuit 14 and post write/read buffer 16 are set by the host data bus clock BCLK, while the sample and hold register 12 and cycle timer 18 are set by the internal counter register clock NCLK. The control circuit 14 receives the internal counter register clock NCLK to synchronize both clocks. Prior to a read operation, during synchronization, the sample and hold register 12 continues to sample the current count value provided by the cycle timer 18. Immediately upon a host data bus read request signal, this continuous sampling of the cycle timer 18 ceases. At this point, the control circuit 14 sends a flag to the post write/read buffer 16 to copy the current count value stored in the sample and hold register 12 to the buffers internal to the post write/read buffer 16. At the rising edge of the host data bus clock BCLK, the control circuit 14 sends a second flag to the post write/read buffer 16 to transfer the all 32 bits of the current count value in 8-bit bytes, through an multiplexer 20 to a data output 25.

During a host data bus write operation, counter register 30 operates in the following manner. At the rising edge of the internal counter clock NCLK, the control circuit 14 sends a flag to the sample and hold register 12 to transfer the current count value from the cycle timer 18 to the sample and hold register 12. The sample and hold register 12 is coupled to the post write/read buffer 16 such that the current counter value from the sample and hold register 12 sits at the input of the post write/read buffer 16, however is not transferred to the buffers internal to the post write/read buffer 16. Upon the rising edge of the host data bus clock BCLK, the control circuit 14 generates a second flag for the post write/read buffer 16 to transfer the current count value at its input to its internal buffers. Once all four bytes have been transferred to the post write/read buffer 16, the control circuit 14 sends a flag to the post write/read buffer 16 to transferred the contents of its buffers, the new 32-bit count value, to the cycle timer 18.

Figure 2:
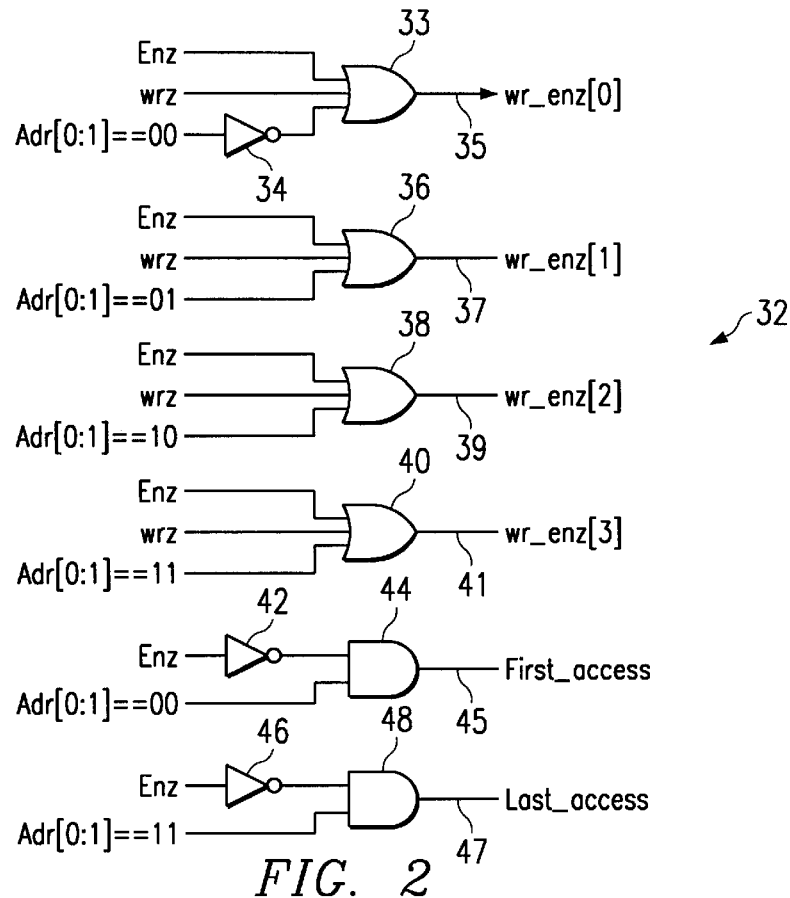
FIG. 2 is a schematic of an address decode logic for the counter register of FIG. 1.

FIG. 2 is a schematic of an address decode logic 32 for the counter register of FIG. 1. The control circuit 14 of FIG. 1 includes the address decode logic 32 which functions to determine which buffer the 8-bit byte from data signal 24 should be transferred to within the post write/read buffer 16. The address decode logic 32 determines if address signal 21 points to the first, second, third or fourth byte of data, Data_in. In addition, the address decode logic 32 determines when data 24 can be written to the cycle timer 18. The address decode logic 32 receives the following input signals: the enable signal 22, the write enable signal 23, and the address signal 21. The address decode logic 32 processes these signals and can generate write enable signals 35, 37, 39, and 41 for byte 0, byte 1, byte 2, and byte 3, respectively, of logic level "0", or active. The address decode logic 32 then uses this information to determine in which of four buffer areas in the post write/read buffer 16 to store the data, Data_in. Since the counter register 30 of FIG. 1 is a 32-bit count register and requires four 8-bit bytes to be available before post write/read buffer 16 can transfer data to cycle timer 18, the address decoder 32 sets a first_access signal 45 to a logic level "1" in order to prevent data in a data buffer area from being transferred to cycle timer 18. When the first byte is transferred, the address decoder 32 sets a first_access signal 45 to a logic level "1" which signifies that the first byte is going to be transferred to the post write/read buffer 16. When host data bus 29 writes to byte 3 of the post write/read buffer 16, the last_access signal 47 is set to a logic level "1". After the last_access 47 changes from "1" to "0" and two internal counter clock NCLK cycles, the post write/read buffer 16 value is transferred to cycle timer 18 at the leading edge of internal counter clock NCLK 27.

Specifically, the address decode logic 32 includes a first three input OR gate 32, a second three input OR gate 36, a third three input OR gate 38, a fourth three input OR gate 40, a first two input AND gate 44, and a second two input AND gate 48. The specific addresses for access to byte 0, byte 1, byte 2 and byte 3 of the post write/read buffer 16 in FIG. 1 correspond to the two-bit address signal 21. When the address signal 21 is "00," "01," "10," or "11," the first, second, third or fourth byte is being accessed, respectively. Each of the four OR gates 33, 36, 38, and 40 receive the enable signal 22, write enable signal 23 and address 21 for generating write enable signals Wr_enz[0] 35, Wr_enz[1] 37, Wr_enz[2] 39, and Wr_enz[3] 41. Each of the AND gates 44 and 48 receive the enable signal 22 and address 21 to generate a first_access signal 45 and a last_access signal 47. When the address signal 21 is either a "00" or a "11," a signal is generated to flag when the byte being transferred is either the first or the last, respectively.

FIG. 3 illustrates a schematic of a portion of the embodiment shown in FIG. 1, including sample and hold register 12, post write/read buffer 16, and cycle timer 18 of FIG. 1. Post write/read buffer 16 functions as a buffer for data which is being transferred from host data bus 29 to the counter register 30. Since the counter register 30 is preferably thirty-two bits wide, post write/read buffer 16 is designed to transfer up to thirty-two bits at one time. Since host data bus 29 is preferably eight bits or sixteen bits wide, post write/read buffer 16 receives several data transfers from host data bus 29 before it transfers the data to the cycle timer 18. Post write/read buffer 16 is capable of transferring thirty-two bits at one time which is a requirement of the cycle timer 18.

Four transfers of the 8-bit data signal Data_in 24 designate bytes 0 through 3. Each of the four bytes, along with feedback from the output of the sample and hold register 12 propagate through multiplexers 52, 60, 66, and 72, respectively. Since post write/read buffer 16 is able to transfer thirty-two bits of data at the same time, it must contain buffer areas for each of the four bytes of the data signal 24. Therefore, post write/read buffer 16 contains a byte 0 buffer 56, a byte 1 buffer area 64, a byte 2 buffer area 70, and a byte 3 buffer area 76. Each buffer area will function to hold and transfer data to either the first, second, third, or fourth byte of counter register 30. Data buffer 56 consists of a D-type flip-flop with an enable input. The enable input of data buffer 56 causes the D-type flip-flop of address buffer 56 to ignore the clock signal until buffer write enable signal generated by multiplexer 54 is a logic level "0". Thus, address buffer 56 does not change states until buffer write enable signal is a logic level "0". Address buffer 56 functions to hold the first byte of data signal Data_in 24.

The following holds true for data buffers 64, 70 and 76 which consists of D-type flip-flops with enable inputs. The enable input of these data buffers 64, 70, and 76 operate in the same manner as that of data buffer 56. Data buffers 64, 70 and 76 hold the second, third and fourth bytes of data signal Data_in 24, respectively, until the write enable signal generated by multiplexers 62, 68 and 74 determines that data signal 24 can be transferred to cycle timer 18. The fifth, sixth, seventh, and eighth multiplexers 54, 62, 68, and 74 use the write enable signals write enable signals Wr_enz[0] 35, Wr_enz[1] 37, Wr_enz[2] 39, and Wr_enz[3] 41, respectively, along with external sample signal 51 generated by synchronization logic 130 of FIG. 8 (to be described further in the specification). Each multiplexer 54, 62, 68, and 74 includes an enable input functionally connected to the host selection signal 117 generated by control logic circuit 14 as shown in FIG. 4 (to be described further in the specification).

Figure 6:
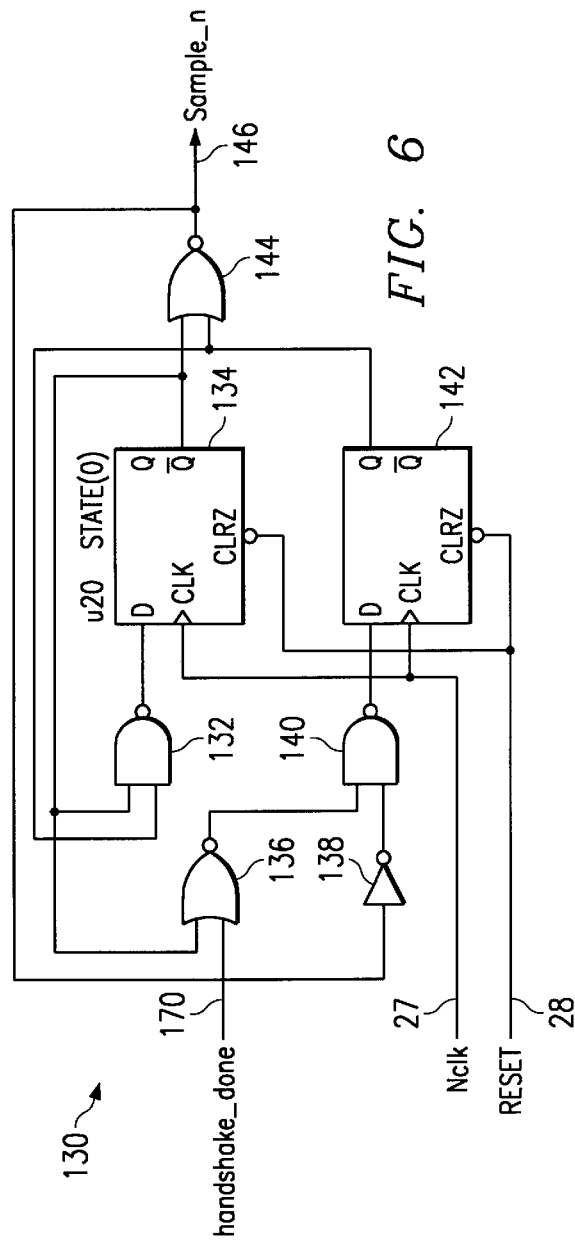
FIG. 6 shows a circuit implementing the state machine of FIG. 5.

Cycle timer 18 consists of a 32-bit increment counter with a load enable input. The load enable input of cycle timer 18 causes the 32-bit increment counter to continue to increment its count value until a load signal 99 of control logic 14 shown in FIG. 4 is a logic level "1". Thus, cycle timer 18 does not update its value with the post write/read buffer 16 value until the load signal 99 is a logic level "1". Once load signal 99 has changed to logic level "1," the post write/read buffer 16 value is transferred to the cycle timer 18. Sample and hold register 12 consists of a D-type flip-flop with an enable input. The enable input of sample and hold register 12 causes the D-type flip-flop of sample and hold register 12 to ignore the clock signal until an internal sample signal 146 of control logic 14 shown in FIG. 6 is a logic level "1". When the internal sample signal 146 has changed to logic level "1," data within the sample and hold register 12 is updated with the cycle timer 18 value. When sample_b signal 51 is a logic level "1" and host_sel signal 117 is a logic level "0," the sample and hold register 12 value is loaded into the post write/read buffer 16 at the next leading edge of the host data bus clock BCLK 26.

The reset signal 28 in FIG. 1 indicates to the post write/read buffer 16 that all elements in byte 0 buffer area 56, byte 1 buffer area 64, byte 2 buffer area 70 and byte 3 buffer area 76 should be reset to default values. Normally, reset signal 28 is set to a logic level "0", or active, at system start up time in order to clear the buffer areas. Otherwise, reset signal 28 is normally set to logic level "1" which is inactive.

Figure 4:
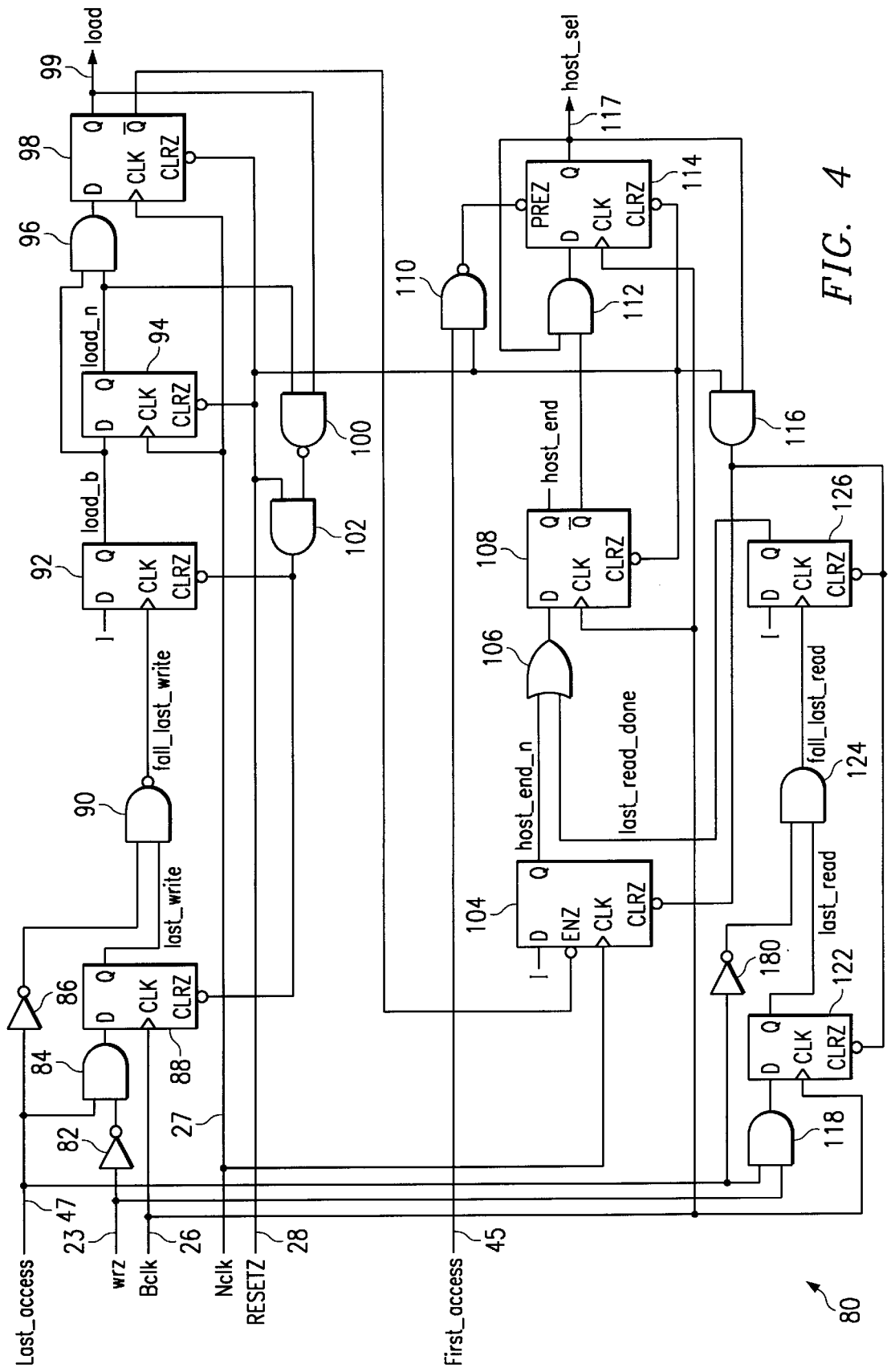
FIG. 4 shows an embodiment of the control logic for the innovative counter register in accordance with the present invention.

FIG. 4 shows an embodiment of the control logic 14 for the innovative counter register in the embodiment represented in FIG. 1. In addition, FIG. 4 shows a circuit for generating a load signal 99 and host_sel signal 117 which are needed to both read and write from the cycle timer 18. The control logic 14 includes nine D-type flip-flops, a first flip-flop 88, a second flip-flop 92, a third flip-flop 94, a fourth flip-flop 98, a fifth flip-flop 104, a sixth flip-flop 108, a seventh flip-flop 114, a eighth flip-flop 122, and a ninth flip-flop 126. Flip-flop 104 contains an enable input which functions in this same way as the enable input on buffer 56. The write enable signal for flip-flop 104 is active when it is set to a logic level "0" and inactive when it is set to a logic level "1". An active write enable signal allows data to be transferred from one point to another. An inactive write enable signal will hold the data transfer until the next leading edge of the appropriate clock when the write enable signal is active. All the other flip-flops do not have an enable input such as that of flip-flop 104 so this means that each of these flip-flops are able to change state with each leading edge of either host data bus clock signal BCLK 26 or internal clock signal NCLK 27. Seventh flip-flop 114 includes a preset input which functions to preset the output value of the flip-flop 114.

The load signal is generated when the last byte is written to the post write/read buffer 16 and the event is in synch with the internal counter clock NCLK 27. Note the top half of the circuit 80, including flip-flops 88, 92, 94, and 98 couple generate load signal 99. During a write operation, the first_access signal would become a logic level "1," presetting flip-flop 114 and making the host_select signal 117 a "1." As one can recall from FIG. 3, the host_select signal enables the buffers 56, 64, 70 and 76 of the post write/read buffer 16 to read in the data signal Data_in 24. Once the last byte has been read into the post write/read buffer 16, last_access signal 47 will become a logic level "1" enabling flip-flop 92 to clock in the logic level "1" at its input D. At the following rising edge of the internal counter clock NCLK, the output Q of flip-flop 92 propagates to the input D of flip-flop 94 through to the output Q of flip-flop 94. At the next rising edge of the internal counter clock NCLK, the output Q of flip-flop 94 logically AND with the output Q of flip-flop 92 propagates to the input D of flip-flop 98 through to the output Q of flip-flop 98. The output Q of flip-flop 98 provides the load signal 99 at logic level "1". This is the same signal 99 that is used in FIG. 3 as disclosed above. Flip-flops 94 and 98 are used to synchronize "finishing to write the last byte" event with the internal counter clock NCLK. They also generate load signal 99 in order to update the cycle timer 18 with the post write/read buffer 16 value.

At the following rising edge of the internal counter clock NCLK, the output Q-NOT of flip-flop 94 propagates to the enable input of flip-flop 104 through to the output Q of flip-flop 104. Since the output of flip-flop 104 is logic level "1", the output of the OR gate 106 is logic level "1". On the next rising edge of the host data bus clock BCLK, the output of the OR gate 106 propagates through flip-flop 108 through to the output Q to provide a signal that communicates to the host system that the transfer has ended. The output Q-NOT of flip-flop 108 propagates through flip-flop 114 to the output Q of flip-flop 114 to generate a host_select signal 117 at logic level "0" used in FIG. 3 as discussed above. When host_sel signal 117 changes to a logic level "0," the post write/read buffer 16 works as a "read buffer" and it will transfer sample and hold register's 12 count value to the post write/read buffer 16 when sample_b signal 51 is logic level "1". After that a stable current cycle timer 18 value is stored in the post write/read buffer 16 and is ready for a host data bus read.

During a host data bus read operation, the control logic 14 in FIG. 4 "locks" the post write/read buffer 16 value which contains the sampled cycle timer's 18 value. In this way, host data bus 29 will read a stable cycle timer 18 value. The host_sel signal 117 implements this "lock" function by disabling the continuous transfer of the current count value transferred from the sample and hold register 12. D-type flip-flops 122, 126, 108 and 114 are used to generate the host_sel signal 117. When host_sel signal 117 is a logic level "1," it prevents the post write/read buffer 16 from being updated during a host data bus read transaction. When the first_access signal 45 is logical level "1," host_sel signal 117 is set to logical level "1". When the last byte is read, a logical level "1" will be clocked to the Q output of flip-flop 122. The output Q of flip-flop 122 propagates to the output Q of flip-flop 126, which sets the input D of flip-flop 108 to logical level "1." The next two leading edges of host data bus clock BCLK 26 will clear the host_sel signal 117 to logical level "0". When the host_sel signal 117 is logical level "0", the post write/read buffer 16 returns to the continuous update of current count value transferred from the sample and hold register 12.

After the data signal 24 has been transferred to the cycle timer 18 of FIG. 1, automatic clear circuitry resets the control circuit with the use of reset signal 28, AND gates, 102 and 116, and NAND gate 100.

Figure 5:
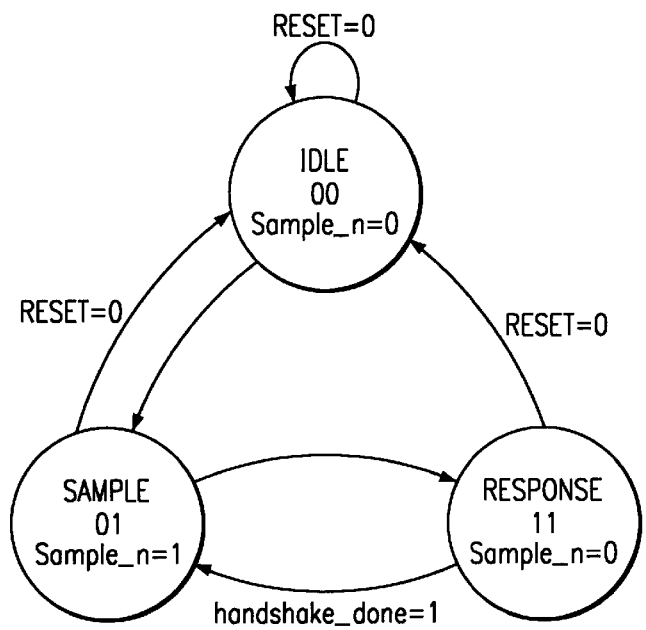
FIG. 5 displays state diagram for the state machine for a portion of the control logic in accordance with the present invention.

FIG. 5 displays state diagram for the state machine for a portion of the control logic in accordance with the present invention. State 00 is an idle state (and the reset state). During State 00 the state machine output sample_n is "0." At the next rising edge of NLCK the state machine will move to State 01. State 01 is a sample state. During State 01 the state machine output sample_n is "1" which enables flip-flop so that a "snapshot" of the cycle timer 18 may be taken. At the next rising edge of NLCK, the state machine will move to State 11. State 11 is a response (wait) state. During State 11, the state machine output sample_n is "0." The state machine will stay in State 11 until the timing circuit returns a "handshake_done" signal 172 which lets the state machine know that the contents of sample and hold register 12 have reached the post write/read buffer 16. At the next rising edge of NLCK, the state machine returns to State 01 and prepares to sample the cycle timer 18 and copy its value into the sample and hold register 12 again.

FIG. 6 shows a circuit implementing the state machine of FIG. 5. Note flip-flop 134 represents state variable 0 and flip-flop 142 represents state variable 1 in the state vector of form [0:1].

Figure 7:
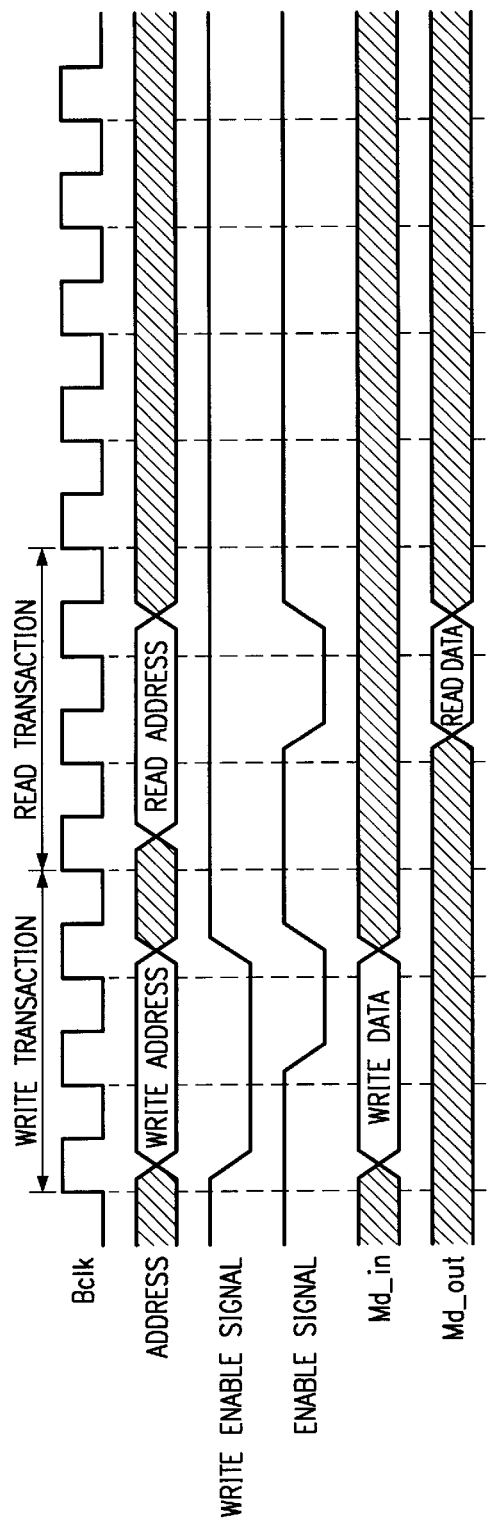
FIG. 7 shows a timing diagram for a host bus transaction within the counter register in accordance with the prior art.

FIG. 7 shows a timing diagram for a host bus transaction within the counter register in accordance with the present invention. For simplicity, host data bus clock BCLK and internal counter clock NCLK have the same frequency but are out of phase with each other. This timing diagram shows a general write transaction and a general read transaction.

The architecture in accordance with the present invention does not require host bus idling while handshaking with another system clock. Advantageously, each read transaction only takes two host bus clock cycles (one cycle for read request and one for read response), whereas with conventional handshaking each read transaction takes at least four host bus clock cycles plus three external system clock cycles to perform the same function. Similarly, each write transaction only takes two host bus clock cycles (one cycle for write request, one for write response), whereas with conventional handshaking each write transaction takes at least four host clock cycles and 3 external system clock cycles to obtain the same result. Request and response handshaking are not required because the host system knows the transactions can be completed in two host bus clock cycles.

Figure 8:
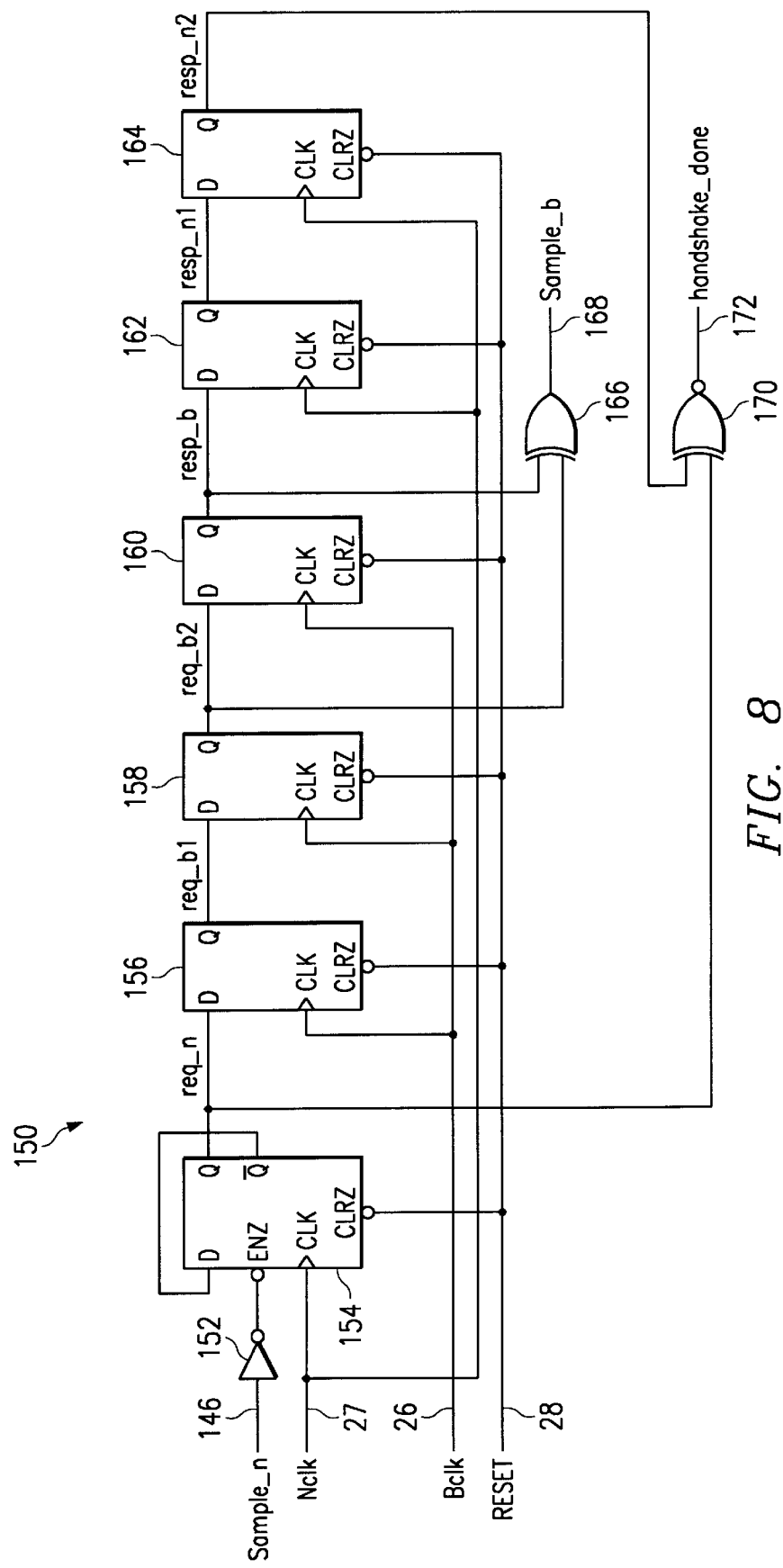
FIG. 8 is a schematic of the synchronization logic for the counter register in accordance with the present invention.

FIG. 8 is a schematic of the synchronization logic for the counter register 30 in accordance with the present invention. This circuit 150 incorporates a chain of flip-flops 154, 156, 158, 160, 162, and 164. The first flip-flop 154 is in a self oscillating configuration with output Q-NOT connected to its input D. The internal sample signal 146 enables flip-flop 154 so that a next rising edge of internal counter clock NCLK will cause a output Q of flip-flop 154 to change states from "1" to "0" or vice-versa. The output Q of flip-flop 154 is loaded into the input D of flip-flop 156 and through to the output of flip-flop 156 at the next rising edge of host data bus clock BCLK. The output Q of flip-flop 156 propagates to the input D of flip-flop 158 and through to the output of flip-flop 158 at the following rising edge of host data bus clock BCLK. At this point the output Q of flip-flop 158 and the output Q of flip-flop 160 coupled to XOR gate 166 to generate an external sample signal 168. At the next rising edge of host data bus clock BCLK, the output of flip-flop 158 propagates to through the input of flip-flop 160 to the output of flip-flop 160. At the following rising edge of the internal counter clock NCLK, the output Q of flip-flop 160 propagates to the input D of flip-flop 162 through to the output of flip-flop 162. At the next rising edge of the internal counter clock NCLK, the output Q of flip-flop 162 propagates to the input D of flip-flop 164 through to the output of flip-flop 164. The XNOR gate 170 detects when the output Q of flip-flop 154 has propagated to the output of flip-flop 164 and places a logic "1" onto the handshake_done signal 172 to signal that the cycle timer 18 value has been successfully loaded into the post write/read buffer 16.

Figure 9:
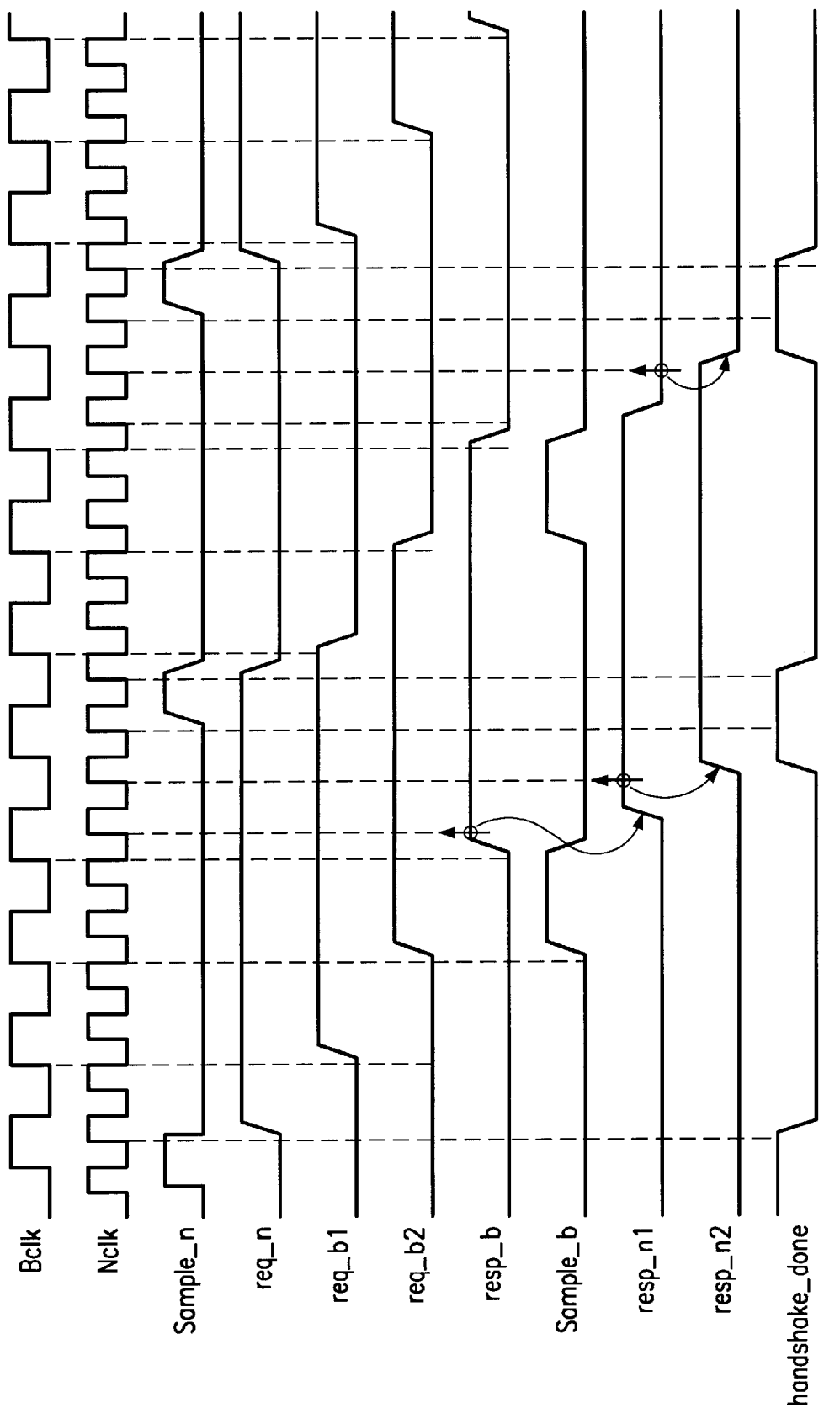
FIG. 9 is a timing diagram for the circuit of FIG. 8.

FIG. 9 is a timing diagram for the circuit of FIG. 8.

Although counter registers can be up to 32-bits wide, the host data bus is often 8 or 16-bits wide. Thus, the following figures provide embodiments for a 16-bit host data bus and a 32-bit host data bus, respectively.

Figure 10:
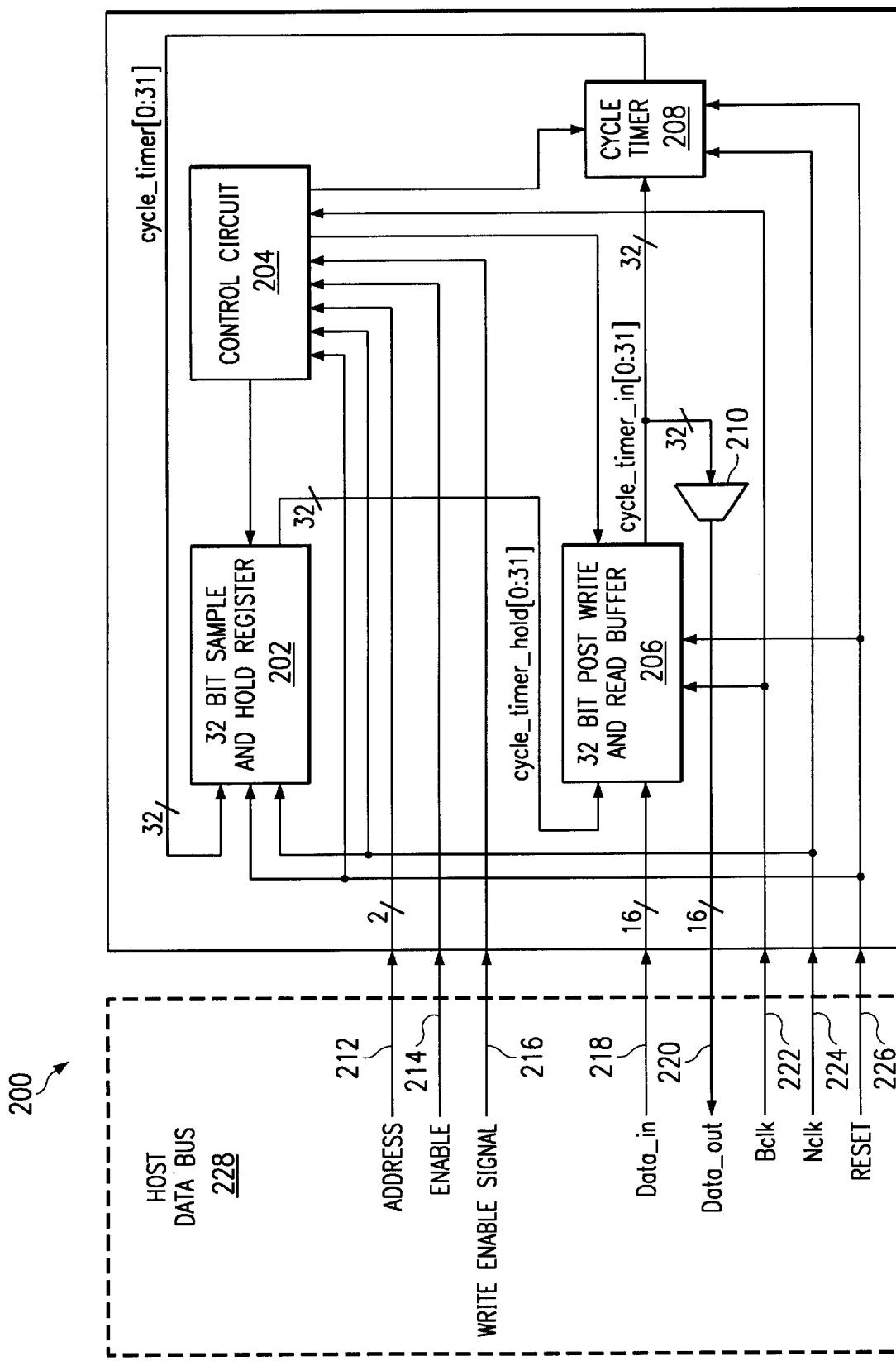
FIG. 10 is a block diagram of a counter register for a 16-bit data bus in accordance with the present invention.

FIG. 10 is a block diagram of a counter register 200 for a 16-bit data bus in accordance with the present invention. The counter register 200 includes a 32-bit sample and hold register 202, a control logic 204, a 32-bit post write/read buffer 206, a cycle timer 208, and a multiplexer 210. The data signal Data_in 218 of the host data bus 228 is coupled to a 32-bit post write/read buffer 206 which itself is coupled to a cycle timer 208. The difference between the 8-bit and 16-bit implementations are that the data signals Data_in and Data_out, (24 and 25) and (218 and 220), hold 8-bits and 16-bits, respectively. The rest of the circuit is configured similar to the 8-bit host data bus implementation shown in FIG. 1.

Referring back to FIGS. 4, 5, 6, and 8, the control circuit 204 operates in the same fashion as that of the 8-bit host data bus implementation of FIG. 1.

Figure 11:
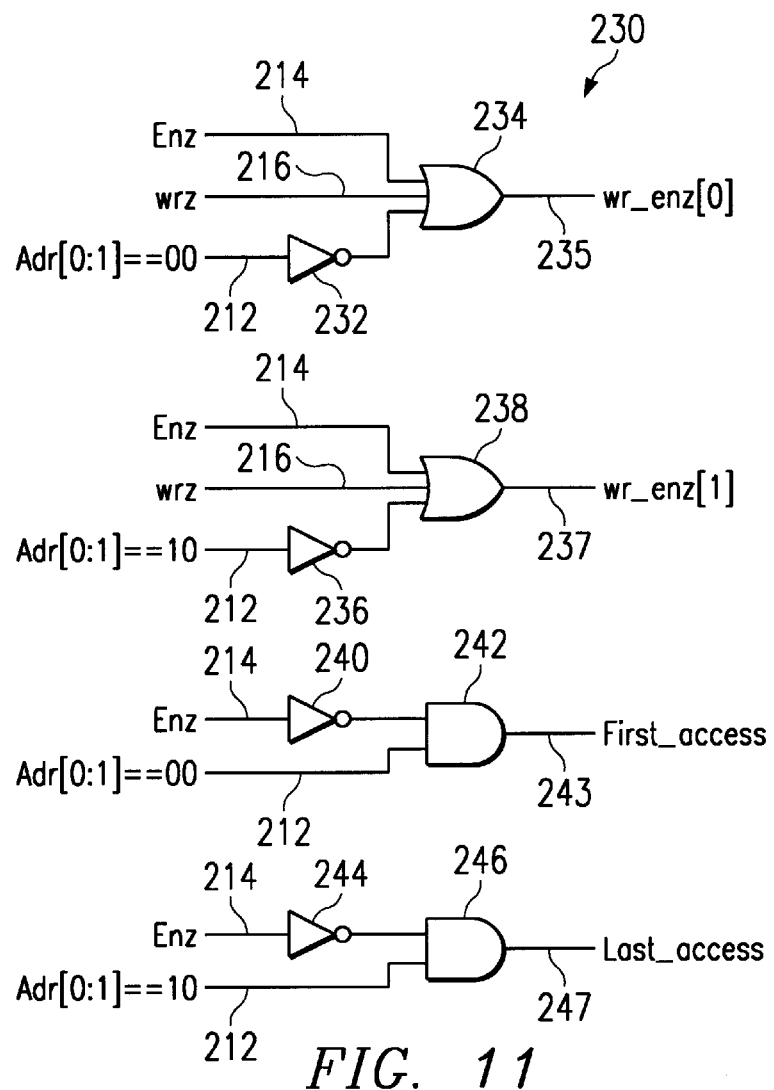
FIG. 11 is a schematic of an address decode logic for the counter register of FIG. 10.

FIG. 11 is the schematic of the address decode circuit 230 of the 16-bit host data bus embodiment. The control circuit 204 includes the address decode circuit 230 which functions to determine which buffer of the post write/read buffer 206 will hold each transferred 16-bit data signal 218. The address decode circuit 230 determines if address signal 212 points to the first or second word of post write/read buffer 206. The address decode logic 230 determines when data 218 can be written to the post write/read buffer 206. Notice similar to the address decode logic 32 of the 8-bit host data bus embodiment in FIG. 2, when the address signal 212 is a "00" or "10", the first and second word is being accessed respectively. Each OR gate 234 and 238 receives the enable signal 214, write enable signal 216 and address signal 212 to generate signals, Wr_enz[0] 235 and Wr_enz[1] 237. Accordingly, each of the AND gates, 242 and 246, receives the enable signal 214 and address signal 212 to generate a first_access signal 243 and a last_access signal 247, respectively.

Figure 12:
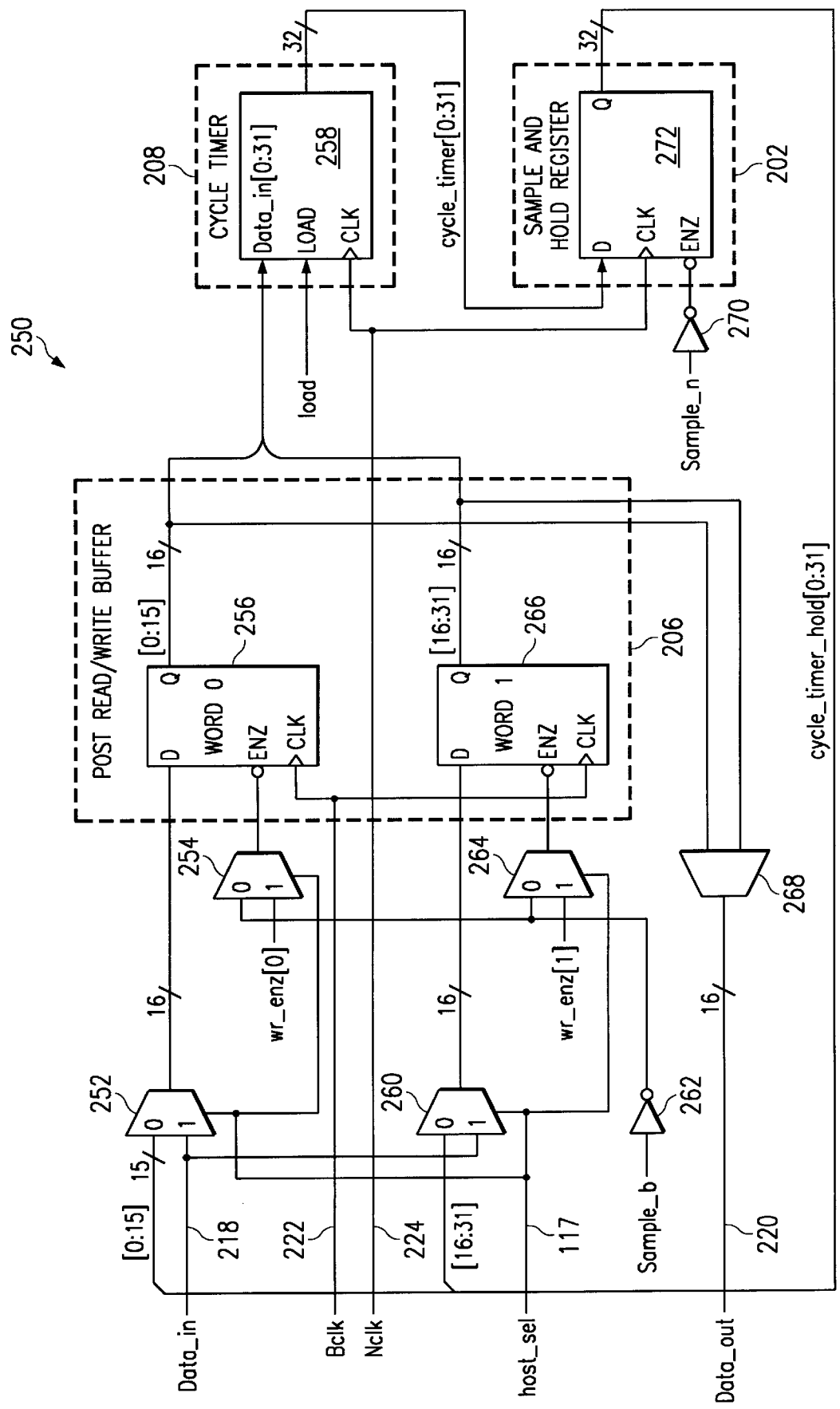
FIG. 12 is a schematic of the post write/read buffer, counter, and sample and hold register of FIG. 10.

FIG. 12 is a schematic of the post write/read buffer 206, cycle timer 208, and sample and hold register 202 of FIG. 10. Note the difference between the 8-bit host data bus embodiment of FIG. 1 and the 16-bit host data bus embodiment 200 is the post write/read buffer 206 configuration includes only two buffers, 256 and 266, for the first and second word of the post write/read buffer 206.

Figure 13:
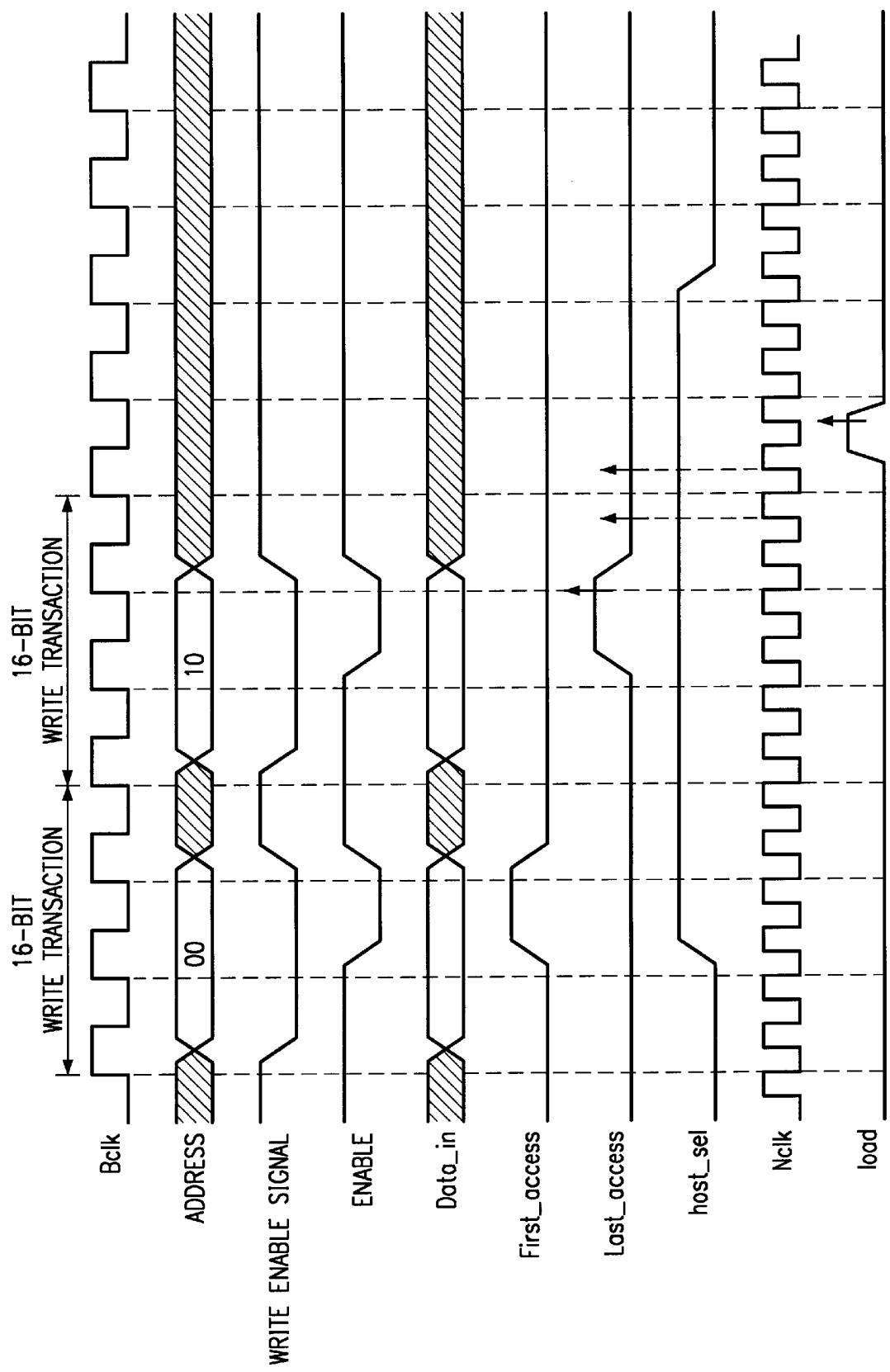
FIG. 13 shows a timing diagram for a host bus transaction within the counter register of FIG. 10.

FIG. 13 shows a timing diagram for the 16-bit host data bus transaction within the counter register of FIG. 10.

Figure 14:
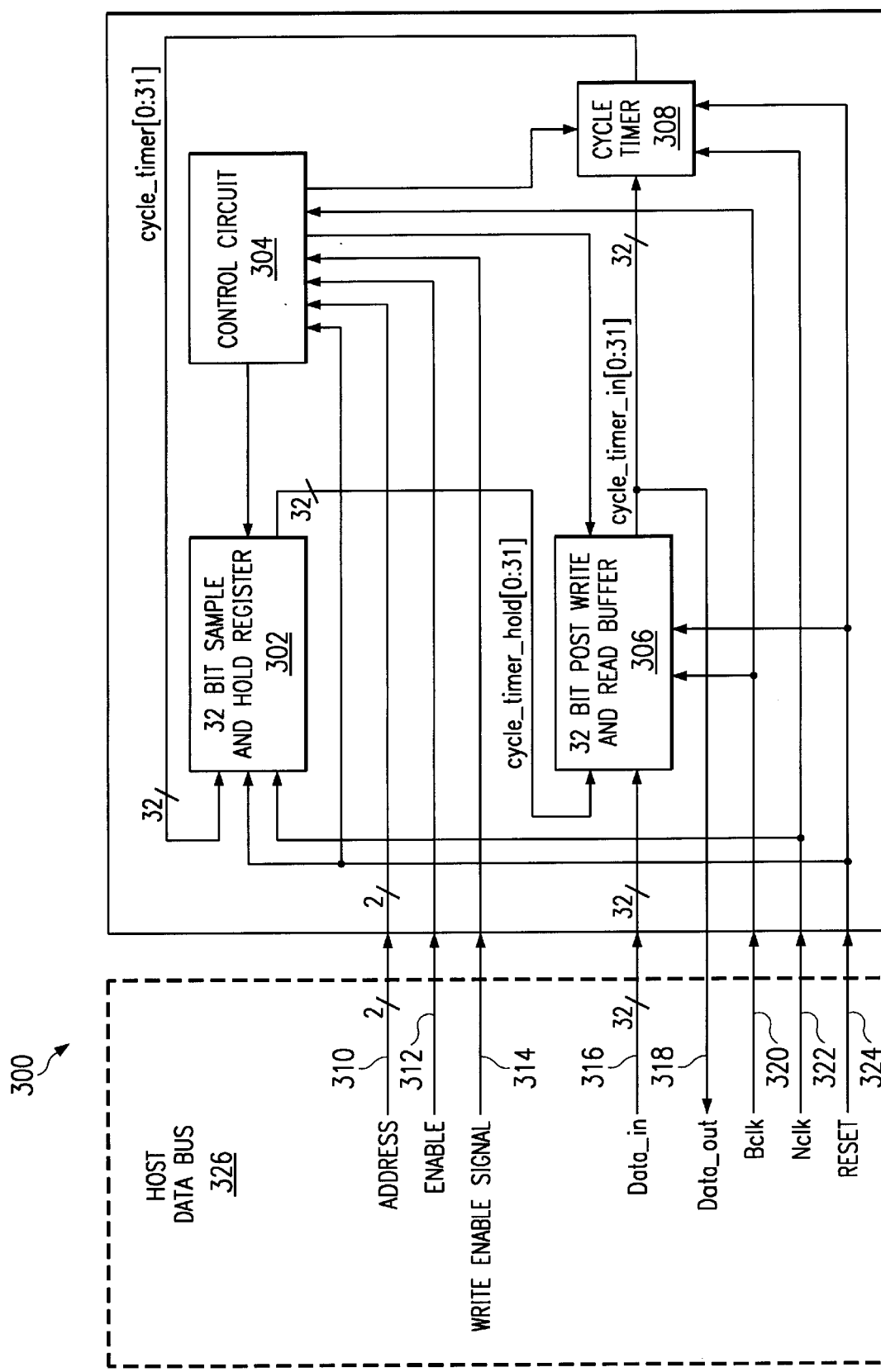
FIG. 14 is a block diagram of a counter register for a 32-bit data bus in accordance with the present invention.

FIG. 14 is a block diagram of a counter register for a 32-bit data bus in accordance with the present invention. The counter register 300 includes a 32-bit sample and hold register 302, a control logic 304, a 32-bit post write/read buffer 306, and a cycle timer 308. The data signal Data_in 316 of the host data bus 326 is coupled to a 32-bit post write/read buffer 306 which itself is coupled to a cycle timer 308. The difference between the 8-bit and 32-bit implementations are that the data signals Data_in and Data_out, (24 and 25) and (316 and 318), hold 8-bits and 32-bits, respectively. The rest of the circuit is configured similar to the 8-bit host data bus implementation shown in FIG. 1.

Referring back to FIGS. 4, 5, 6, and 8, the control circuit 304 operates in the same fashion as that of the 8-bit host data bus implementation of FIG. 1.

Figure 15:
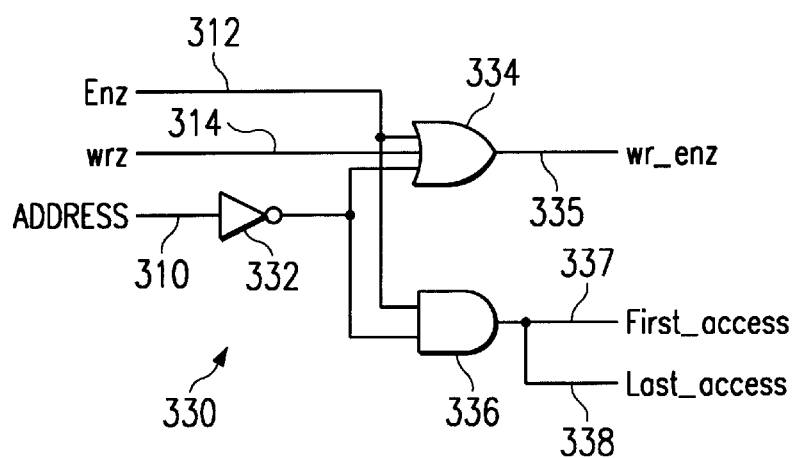
FIG. 15 is a schematic of an address decode logic for the counter register of FIG. 14.

FIG. 15 is the schematic of the address decode circuit 330 of the 32-bit host data bus embodiment. The control circuit 304 includes the address decode circuit 330 which functions to determine that all 32-bits of data signal 316 is to be transferred to the post write/read buffer 306. The address decode logic 330 determines when data 316 can be written to the post write/read buffer 306. Notice similar to the address decode logic 32 of the 8-bit host data bus embodiment of FIG. 1, when the address signal 310 is a "00", the 32-bit post write/read buffer 306 is being accessed. OR gate 334 receives the enable signal 312, write enable signal 314 and address signal 310 to generate signal Wr_enz 335. Accordingly, an AND gate 336 receives the enable signal 312 and address signal 310 to generate a first_access signal 337 and a last_access signal 338.

Figure 16:
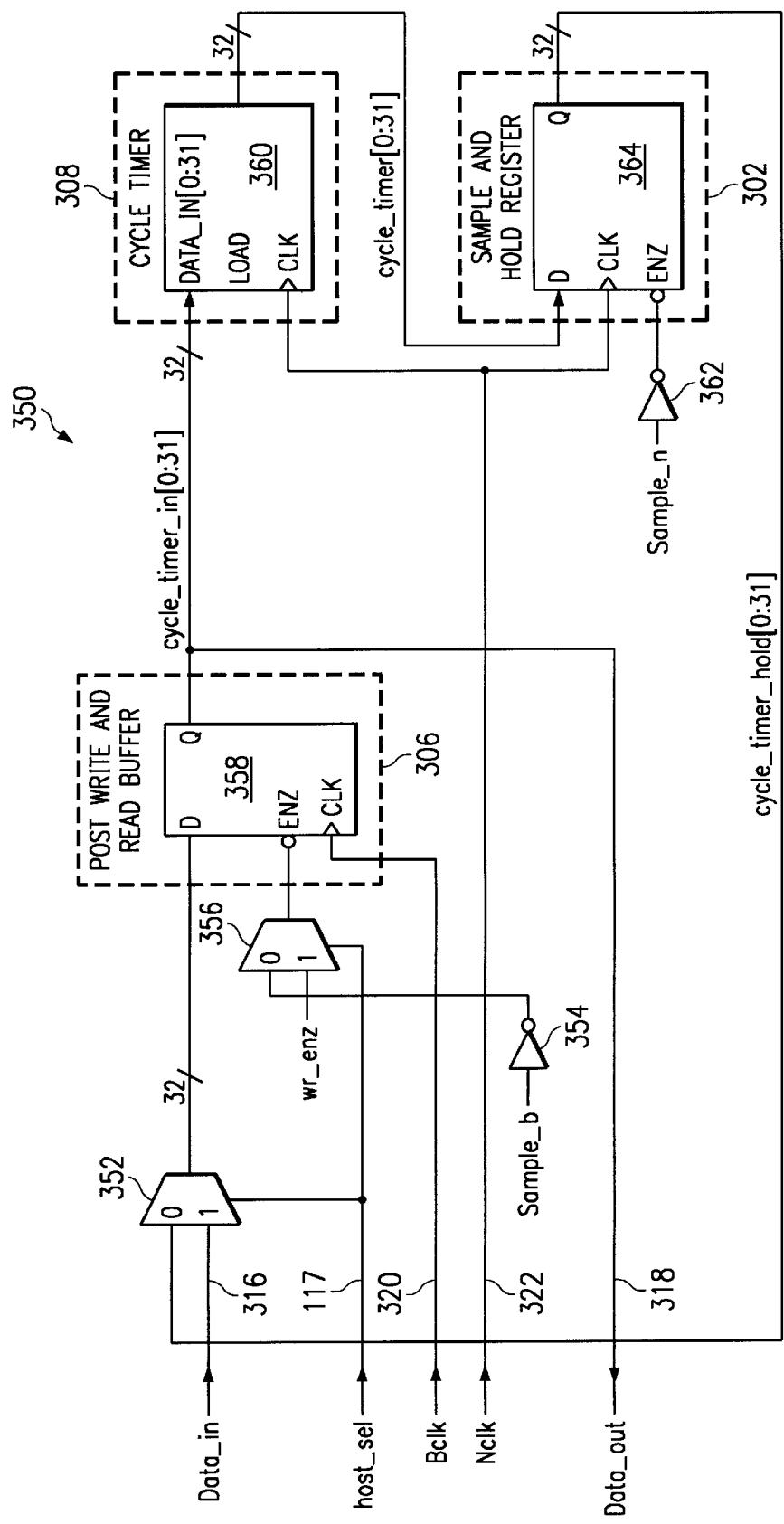
FIG. 16 is a schematic of the post write/read buffer, counter, and sample and hold register of the counter register of FIG. 14.

FIG. 16 is a schematic of the post write/read buffer 306, cycle timer 308, and sample and hold register 302 of FIG. 10. Note the difference between the 8-bit host data bus embodiment of FIG. 1 and the 32-bit host data bus embodiment 300 is the post write/read buffer 306 configuration includes only one buffer, 358, for the 32-bit data signal 316.

See the Appendix for a Verilog RTL (register transfer level) implementation for the address decode logic 32 of FIG. 1 (the address decode logic program—adr_dec_no_swap.v). See also the Appendix for a Verilog RTL (register transfer level) implementation for the counter register 10 of FIG. 1 (the cycle timer program—cycle_timer_reg.v). Verilog HDL (hardware descriptor language) is a HDL used to design and document electronic systems.

According to the teachings of the present invention, a post write/read buffer for systems which have a host data bus clocked by a first clock source and a counter register clocked by a second clock source is provides that handles the transfer of data to the counter register while freeing the host data bus to perform other tasks. The advantages of utilizing a post write/read buffer include eliminating the need for the host data bus to be idle while a clock synchronization procedure occurs and freeing the host data bus to perform other tasks while data is being transferred to the counter register.

Thus, it is apparent that there has been provided in accordance with the present invention, an improved counter register and method for transferring data from a host data bus to a counter register utilizing a post write/read buffer that satisfies the advantages set forth above.

Further scope of applicability of the present invention should become apparent from the detailed description given above. However, it should be understood that the detailed description and specific examples, while indicating embodiments of the invention, are given by way of illustration only, since various changes and modifications within the spirit and scope of the invention should become apparent to those skilled in the art from this detailed description. Accordingly, this detailed description and specific examples are not to be considered as limiting the present invention.

APPENDIX

```
/*********************************************************************
****************************
adr_dec_no_swap.v — big endian byte select and last access within a quadlet
                    big endian register byte map
                    00 —> byte0 —> Byte_selz[0]
                    01 —> byte1 —> Byte_selz[1]
                    10 —> byte2 —> Byte_selz[2]
                    11 —> byte3 —> Byte_selz[3]
Author: Brian Deng
Copyright 1998, Texas Instruments Incorporated
*********************************************************************
****************************/
module adr_dec_no_swap (Bit8, Adr_in, Enz, Byte_selz, First_access, Last_access)
;
    input             Bit8;         // 8 bit data bus
    input    [0:1]    Adr_in;       // address input
    input             Enz;          // access enable, active low
    output   [0:3]    Byte_selz;    // byte select, active low
    output            First_access; // this is the first access for this quadlet
    output            Last_access;  // this is the last access for this quadlet
    wire     [0:1]    Adr_in;
    reg      [0:3]    Byte_selz;
    wire              First_access; // first access within the quadlet
    wire              Last_access;  // last access within the quadlet
    // First_access == (Adr_in == 2'b00)
    // If 8 bit mode, address == 11, 16 bit mode address == 10 —> last access
    assign #1 First_access = ~Enz && (Adr_in == 2'b00);
    assign #1 Last_access = ~Enz && ((Bit8 && (Adr_in == 2'b11)) || (~Bit8 &&
(Adr_in == 2'b10)));
    always @ (Enz or Bit8 or Adr_in)
    begin
        casex ({Enz, Bit8, Adr_in}) // $s full_case parallel_case
            4'b0_1_00:   Byte_selz = #1 4'b0111; // 8 bit mode
            4'b0_1_01:   Byte_selz = #1 4'b1011; // 8 bit mode
            4'b0_1_10:   Byte_selz = #1 4'b1101; // 8 bit mode
            4'b0_1_11:   Byte_selz = #1 4'b1110; // 8 bit mode
            4'b0_0_00:   Byte_selz = #1 4'b0011; // 16 bit mode
            4'b0_0_10:   Byte_selz = #1 4'b1100; // 16 bit mode
            default:     Byte_selz = #1 4'b1111; // disable all byte select
        endcase
    end
endmodule
```

APPENDIX-continued

```
/******************************************************
cycle_timer_reg.v — big endian and little swap, byte select and last access
within a quadlet
                        big endian register byte map
                        00 —> byte0 —> Byte_selz[0]
                        01 —> byte1 —> Byte_selz[1]
                        10 —> byte2 —> Byte_selz[2]
                        11 —> byte3 —> Byte_selz[3]
access cycle timer from host bus for write and read. cycle timer is 32 bit
counter and increment by Nclk.
Author: Brian Deng
Copyright 1998, Texas Instruments Incorporated
******************************************************/
module cycle_timer_reg (Bit8, Byte_selz, First_access, Last_access, Wrz, Md_in,
Md_out, Bclk, Nclk, Resetz) ;
        input              Bit8;            // 8 bit data bus
        input      [0:3]   Byte_selz;       // byte select, active low
        input              First_access;    // first access within a quadlet
        input              Last_access;     // last access within a quadlet
        input              Wrz;             // write, active low
        input      [0:15]  Md_in;           // host bus data input
        output     [0:15]  Md_out;          // host bus data output
        input              Bclk;            // host bus clock
        input              Nclk;            // link clock
        input              Resetz;          // power-up reset, active low
        wire       [0:3]   Byte_selz;       // byte select, active low
        wire               First_access;    // first access
        wire               Last_access;     // last access within the quadlet
        wire               Wrz;
        reg        [0:31]  cycle_timer_in;  // cycle timer load value
        reg        [0:31]  cycle_timer;     // cycle timer current value
        reg        [0:31]  cycle_timer_rd;  // cycle timer read value
        wire       [0:15]  Md_in;           // data input from micro interface
        reg        [0:15]  Md_out;          // data output to micro interface
        wire       [0:7]   even_byte_d;     // even byte data input
        wire       [0:3]   wr_enz;          // byte write enable, active low
        reg                load_b, load_n, load;   // load cycle timer signal
        wire               clear_loadz;     // clear load signal
        reg                host_sel;        // host transaction in process
        reg                host_end_n, host_end;   // caused by last cycle timer read or
write
        wire               clear_host_end_nz;      // clear host_end_n, active low
        reg                last_write;      // last write
        wire               fall_last_write; // detect falling edge of last write
        reg                last_read;       // last read
        wire               fall_last_read;  // detect falling edge of last read
        reg                last_read_done;  // have done last read
        assign #1 even_byte_d = Bit8 ? Md_in[8:15] : Md_in[0:7]; // if 8 bit, use 8:15
        // if host_sel = 0, continuously update cycle_timer_in with cycle_timer
        assign #1 wr_enz = ({4{Wrz}} | Byte_selz) & {4{host_sel}}; // write enable
for each byte, active low
        // -----------------------------------------------------------------------------------------
---------------------------------------
        // cycle_timer_in is loaded with either from Md_in or from cycle_timer(current
cycle timer value)
        // when host bus load cycle timer, cycle_timer_in comes from Md_in
        // -----------------------------------------------------------------------------------------
---------------------------------------
        always @(posedge Bclk or negedge Resetz) // byte 0
        begin
                if (~Resetz) cycle_timer_in[0:7] = #1 8'h0; // clear to 0
                else if (~wr_enz[0]) cycle_timer_in[0:7] = #1 host_sel ? even_byte_d :
cycle_timer[0:7];
        end
        always @(posedge Bclk or negedge Resetz) // byte 1
        begin
                if (~Resetz) cycle_timer_in[8:15] = #1 8'h0; // clear to 0
                else if (~wr_enz[1]) cycle_timer_in[8:15] = #1 host_sel ? Md_in[8:15] :
cycle_timer[8:15];
        end
        always @(posedge Bclk or negedge Resetz) // byte 2
        begin
                if (~Resetz) cycle_timer_in[16:23] = #1 8'h0; // clear to 0
                else if (~wr_enz[2]) cycle_timer_in[16:23] = #1 host_sel ? even_byte_d :
cycle_timer[16:23];
        end
        always @(posedge Bclk or negedge Resetz) // byte 3
```

APPENDIX-continued

```
    begin
        if (~Resetz) cycle_timer_in[24:31] = #1 8'h0; // clear to 0
        else if (~wr_enz[3]) cycle_timer_in[24:31] = #1 host_sel ? Md_in[8:15] : cycle_timer[24:31];
    end
// -------------------------------------------------------
// cycle timer read value
// -------------------------------------------------------
    always @(posedge Bclk or negedge Resetz)
    begin
        if (~Resetz) cycle_timer_rd = #1 32'h0; // clear to 0
        else cycle_timer_rd = #1 cycle_timer_in; // continuously sample cycle_timer_in
    end
// -------------------------------------------------------
// cycle timer read value
// -------------------------------------------------------
    always @(Wrz or Bit8 or Byte_selz or cycle_timer_rd)
    begin
        casex ({Wrz, Bit8, Byte_selz}) // $s full_case parallel_case
            6'b1_1_0111: begin // read byte 0
                            Md_out[0:7] = 8'h0;
                            Md_out[8:15] = cycle_timer_rd[0:7];
                         end
            6'b1_1_1011: begin // read byte 1
                            Md_out[0:7] = 8'h0;
                            Md_out[8:15] = cycle_timer_rd[8:15];
                         end
            6'b1_1_1101: begin // read byte 2
                            Md_out[0:7] = 8'h0;
                            Md_out[8:15] = cycle_timer_rd[16:23];
                         end
            6'b1_1_1110: begin // read byte 3
                            Md_out[0:7] = 8'h0;
                            Md_out[8:15] = cycle_timer_rd[24:31];
                         end
            6'b1_0_0011: begin // read byte 0, byte1 for 16 bit mode
                            Md_out[0:7] = cycle_timer_rd[0:7];
                            Md_out[8:15] = cycle_timer_rd[8:15];
                         end
            6'b1_0_1100: begin // read byte 2, byte3 for 16 bit mode
                            Md_out[0:7] = cycle_timer_rd[16:23];
                            Md_out[8:15] = cycle_timer_rd[24:31];
                         end
            default:     begin
                            Md_out[0:7] = 8'h0;
                            Md_out[8:15] = 8'h0;
                         end
        endcase
    end
// -------------------------------------------------------
// cycle timer
// -------------------------------------------------------
    always @(posedge Nclk or negedge Resetz)
    begin
        if (~Resetz) cycle_timer = #1 32'h0; // clear to 0
        else if (load) cycle_timer = #1 cycle_timer_in; // load cycle_timer_in
        else cycle_timer = #1 cycle_timer + 1; // increment cycle timer value
    end
// ----------------------------------------------------------------------------------------------
// host_sel = 1, select Md_in to load cycle_timer_in for write transaction.
// host_sel = 1, inhibit changing of cycle_timer_in for read transaction, so
//                micro interface can read a stable cycle timer value.
// host_sel = 0, cycle_timer_in will continuously update with current cycle
//                timer value and get aready for any cycle timer read
//                transaction.
// Resetz asynchronous reset host_sel to 0.
// First_access asynchronous set host_sel to 1.
// host_end synchronous clear host_sel to 0.
// ----------------------------------------------------------------------------------------------
    always @(posedge Bclk or negedge Resetz or posedge First_access)
    begin
        if (~Resetz) host_sel = #1 1'b0;
        else if (First_access) host_sel = #1 1'b1; // first byte or word cycle timer read or write
        else if (host_end) host_sel = #1 1'b0; // when host transaction end, unlock cycle_timer_in
                                               // it will continuously update with current cycle timer value
```

APPENDIX-continued

```verilog
        end
// --------------------------------------------------------------------------------
// need to detect falling edge of Last_access for write
// --------------------------------------------------------------------------------
        always @(posedge Bclk or negedge clear_loadz)
        begin
            if (~clear_loadz) last_write = #1 1'b0;  // need to modify
            else last_write = #1 (~Wrz && Last_access);  // last host write, set load(Bclk domain) to 1
        end
        assign #1 fall_last_write = ~Last_access && last_write;  // detect falling edge of last access write
// --------------------------------------------------------------------------------
// latch last access write falling edge to set load_b
// load_b won't reset to 0 until load is set to 1
// --------------------------------------------------------------------------------
        always @(posedge fall_last_write or negedge clear_loadz)
        begin
            if (~clear_loadz) load_b = #1 1'b0;  // need to modify
//          else load_b = #1 last_write;  // last host write, set load(Bclk domain) to 1
            else load_b = #1 1'b1;  // last host write, set load(Bclk domain) to 1
        end
        always @(posedge Nclk or negedge Resetz)
        begin
            if (~Resetz) load_n = #1 1'b0;  // need to modify
            else load_n = #1 load_b;  // sample load_b by Nclk
        end
        always @(posedge Nclk or negedge Resetz)
        begin
            if (~Resetz) load = #1 1'b0;
//          else load = #1 load_n;
            else load = #1 (load_b && load_n);  // make load high for just one Nclk cycle
        end
        // make clear_loadz low for one Nclk cycle for clear load signal
        assign #1 clear_loadz = Resetz && (~(load_n && load));  // clear load signal, "load" last for 1 Nclk cycle
// ----------------------------------------------------------------------------------------
// host_end: after load cycle timer or read from cycle timer, host_end is used to clear host_sel.
// ----------------------------------------------------------------------------------------
        assign #1 clear_host_end_nz = Resetz && host_sel;  // when host_sel == 0, clear host_end_n
        always @(posedge Nclk or negedge clear_host_end_nz)
        begin
            if (~clear_host_end_nz) host_end_n = 1'b0;
            else if (load) host_end_n = #1 1'b1;         // finish write, latch load signal
        end
// --------------------------------------------------------------------------------
// need to detect falling edge of Last_access for read
// --------------------------------------------------------------------------------
        always @(posedge Bclk or negedge clear_host_end_nz)
        begin
            if (~clear_host_end_nz) last_read = 1'b0;
            else last_read = #1 (Last_access && Wrz);  // last read
        end
        // the rising edge of fall_last_read indicate ending of last_read
        assign #1 fall_last_read = ~Last_access && last_read;
        always @(posedge fall_last_read or negedge clear_host_end_nz)
        begin
            if (~clear_host_end_nz) last_read_done = #1 1'b0;
//          else last_read_done = #1 last_read;  // lock last read falling edge
            else last_read_done = #1 1'b1;  // lock last read falling edge
        end
        always @(posedge Bclk or negedge Resetz)
        begin
            if (~Resetz) host_end = 1'b0;
            else host_end = #1 (host_end_n || last_read_done);  // finish write or read
        end
endmodule
```

What is claimed is:

1. A circuit structure for a counter register in a multi-clock system, including a host data bus having an addressing signal, a host data bus clock, and a data signal comprising:

a post write/read buffer comprising at least one data buffer operable to receive data from the host data bus and thereby releasing the host data bus for other functions;

a cycle timer coupled to the post write/read buffer to receive data from the post write/read buffer, the cycle timer operable to count the cycle periods of an internal counter clock;

a sample and hold circuit coupled to the cycle timer operable to sample a current count value of the cycle timer; and a control circuit coupled to the post write/read buffer, the cycle timer, and the sample and hold circuit operable to generate an addressing scheme to determine which byte of data is stored in the post write/read buffer, the control circuit operable to synchronize the host data bus clock and the internal counter clock, the control circuit operable to control the transfer of data from the post write/read buffer to the cycle timer.

2. The circuit of claim 1, wherein the control circuit includes an address decoder, the address decoder is operable to generate at least one write pending signal.

3. The circuit of claim 2, wherein the address decoder having a write enable circuit is operable to:

receive a buffer write enable signal from the host data bus; and forward the buffer write enable signal to the post write/read buffer initiating a data transfer from the host data bus to the cycle timer.

4. The circuit of claim 3, wherein the write enable circuit are further operable to generate a write busy status signal indicating that data in the data buffer has not been written to the cycle timer.

5. The circuit of claim 1, further comprising a reset signal for resetting the post write/read buffer circuit elements to default values.

6. The circuit of claim 1, wherein the host data bus has a capacity of 8 bits.

7. The circuit of claim 1, wherein the host data bus has a capacity of 16 bits.

8. The circuit of claim 1, wherein the host data bus has a capacity of 32 bits.

9. The circuit of claim 1, wherein the data buffer has a capacity of 8 bits.

10. The circuit of claim 1, wherein the control circuit comprises a state machine functionally connected to a signal transfer chain.

11. The circuit of claim 1, wherein the control circuit comprises a state machine functionally connected to a signal transfer chain, the state machine comprising an idle state, a sample state for enabling the second data storage device, and response state for returning to the sample state when the status information has reached the host system.

* * * * *